June 3, 1952 L. W. BOOTHBY 2,598,671

FREQUENCY DISTINGUISHING DEVICE

Filed Oct. 16, 1945 5 Sheets-Sheet 1

Inventor
LAWRENCE W. BOOTHBY

By Ralph L Chappell
Attorney

FREQUENCY DISTINGUISHING DEVICE

Filed Oct. 16, 1945 5 Sheets-Sheet 2

Inventor
LAWRENCE W. BOOTHBY

By Ralph L Chappell
Attorney

June 3, 1952 L. W. BOOTHBY 2,598,671

FREQUENCY DISTINGUISHING DEVICE

Filed Oct. 16, 1945 5 Sheets-Sheet 3

Inventor
LAWRENCE W. BOOTHBY

By Ralph L. Chappell

Attorney

Inventor
LAWRENCE W. BOOTHBY
By Ralph L. Chappell
Attorney

June 3, 1952 L. W. BOOTHBY 2,598,671

FREQUENCY DISTINGUISHING DEVICE

Filed Oct. 16, 1945 5 Sheets-Sheet 5

Inventor

LAWRENCE W. BOOTHBY

By Ralph L. Chappell

Attorney

Patented June 3, 1952 2,598,671

UNITED STATES PATENT OFFICE 2,598,671

FREQUENCY DISTINGUISHING DEVICE

Lawrence W. Boothby, Alexandria, Va.

Application October 16, 1945, Serial No. 622,659

3 Claims. (Cl. 178—44)

(Granted under the act of March 3, 1883, as amended April 30, 1928; 370 O. G. 757)

This invention relates to frequency determining apparatus, and more particularly to a frequency determining device adapted to distinguish between a plurality of signal responses, only one of which corresponds to the actual carrier frequency being received.

In the operation of certain ultra high frequency superheterodyne raido receivers ambiguous frequency readings often occur because of the presence of spurious responses. Spurious responses may be produced by non-linearity in the mixer, and if harmonics of the fundamental frequency of the local oscillator combine in the mixer, predominantly with the fundamental of the incoming signal; and to a lesser extent with the higher harmonics of the signal, which are usually of negligible amplitude. Under these circumstances, it is often difficult, if not impossible, to determine the true carrier frequency being received.

In the prior art, attempts were made to use one or more stages of preselection in order to minimize trouble from spurious responses produced in superheterodyne receivers. However, preselection for ultra-high frequency receivers which are required to tune over an extended range has not proven feasible to-date. The inductor and capacitor circuit combinations commonly employed for wave trap applications at lower frequencies are unsatisfactory in this instance because of the limited tuning ranges which may be obtained, and difficulties due to spurious resonances in the lumped circuits.

Accordingly, it is an object of the present invention to provide simple positive means for distinguishing between a plurality of signal responses, and to thereby enable the selection of a correct frequency reading corresponding to the fundamental of the carrier frequency actually being received by the radio receiver.

A further object of this invention is to provide a frequency distinguishing device having a low insertion loss during the time signals are being received by the superheterodyne receiver.

Still another object of this invention is to provide a frequency distinguishing device which is simple and compact and which will tune over a frequency range of the order of 26 to 1.

It is still another object of this invention to provide a frequency distinguishing device which will enable the measurement of frequencies which are relatively high.

Other and further objects of this invention will be obvious upon understanding of the illustrative embodiments about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, in which.

Figure 1:
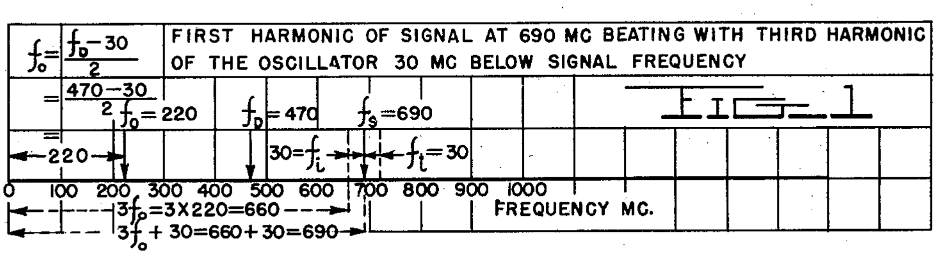
Fig. 1 is a diagram illustrating a specific example of the formation of a spurious response.

Referring now to Fig. 1, there is shown diagrammatically the formation of a spurious response in the particular case of the first harmonic of the signal at 690 megacycles, beating with the third harmonic of the oscillator, the third harmonic of the oscillator being 30 megacycles below the first harmonic of the signal frequency.

In the particular heterodyne receiver to which Figs. 1 to 4, inclusive apply, the local oscillator frequency $f_0$ is given by the following:

$$f_0=\frac{f_d-f_i}{2} \qquad (1)$$

Where $f_d$ equals the frequency in megacycles indicated on the receiver dial, which is calibrated to correspond to the frequency of anti-resonance of the input stage; and in which $f_i$ is equal to the intermediate-frequency of the receiver.

Equation 1 states that the second harmonic of the oscillator frequency, $2f_0$, tracks below the dial frequency $f_d$, by a constant amount equal to the intermediate frequency, $f_i$, of the receiver.

When the intermediate frequency is 30 megacycles, and the oscillator frequency tracks below the dial frequency:

$$f_0=\frac{f_d-30}{2} \qquad (2)$$

In the present example, the calibrated dial reading on the receiver dial will indicate that a response obtained corresponds to the fundamental carrier frequency only when the oscillator second harmonic beats with the carrier fundamental, and the second harmonic of the oscillator is 30 megacycles below the carrier fundamental frequency. However, as shown in Figs. 1 to 3 inclusive, very often not the second harmonic, but the third, fourth, fifth, or sixth harmonic, etc. may beat with the fundamental frequency of a signal, thereby giving rise to spurious frequency readings.

Figure 2:
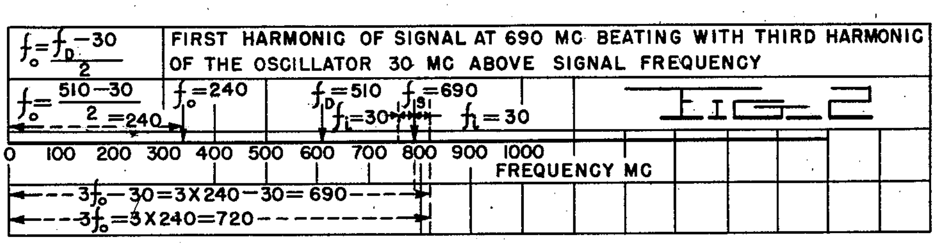
Fig. 2 is a diagram illustrating another specific example of the formation of a spurious response.

Referring to Fig. 2, the formation of a spurious response there shown is similar to the example of Fig. 1, with the exception that the third harmonic of the oscillator frequency is instead 30 megacycles above the fundamental signal frequency, and is beating with the fundamental signal frequency, to produce another spurious response on the dial.

Figure 3:
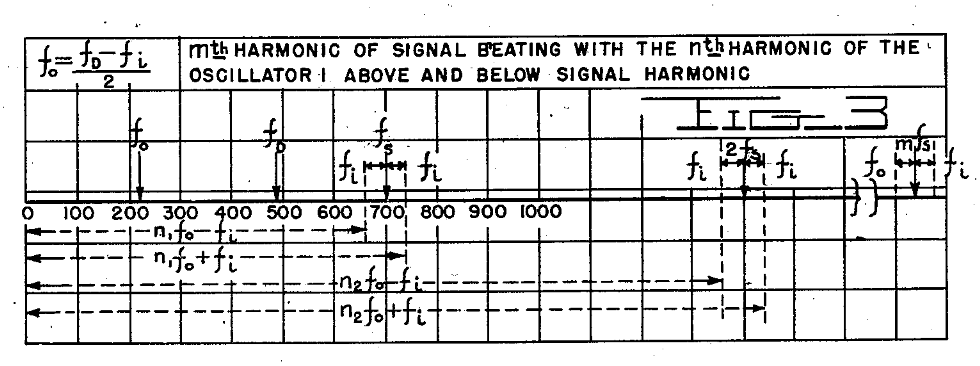
Fig. 3 is a diagram illustrating the formation of spurious responses in general.

In Fig. 3 there is diagrammatically shown the general case of the production of spurious responses. There is shown the fundamental signal frequency as well as the second harmonic and the $n$th harmonic of the oscillator beating with the first, second, or $m$th harmonic of the signal frequency. The oscillator harmonic may beat with the signal harmonic either $f_i$ above, or $f_i$ below the signal harmonic.

From a consideration of the Fig. 3 and having a receiver which tracks according to Equation 1, it is possible to set down a general relation for all spurious responses which may be received over the dial of the receiver, as follows:

$$mf_s=nf_0\pm f_i \qquad (3)$$

But from Equation 1:

$$f_0=\frac{f_d-f_i}{2}$$

Hence in this case:

$$mf_s=n\frac{f_d-f_i}{2}\pm f_i \qquad (4)$$

From which, solving for $f_d$ $$f_d=\frac{2}{n}(mf_s\mp f_i)+f_i \qquad (5)$$

In the particular case when $f_i$ equals 30 megacycles, Equation 5 becomes:

$$f_d=\frac{2}{n}(mf_s\mp 30)+30 \qquad (6)$$

This relation has been found to accurately correspond to spurious frequencies obtained empirically.

Although the frequencies of the spurious responses can be calculated from the above equations, the procedure is not simple, and the present invention avoids the necessity for such calculations.

Figure 4:
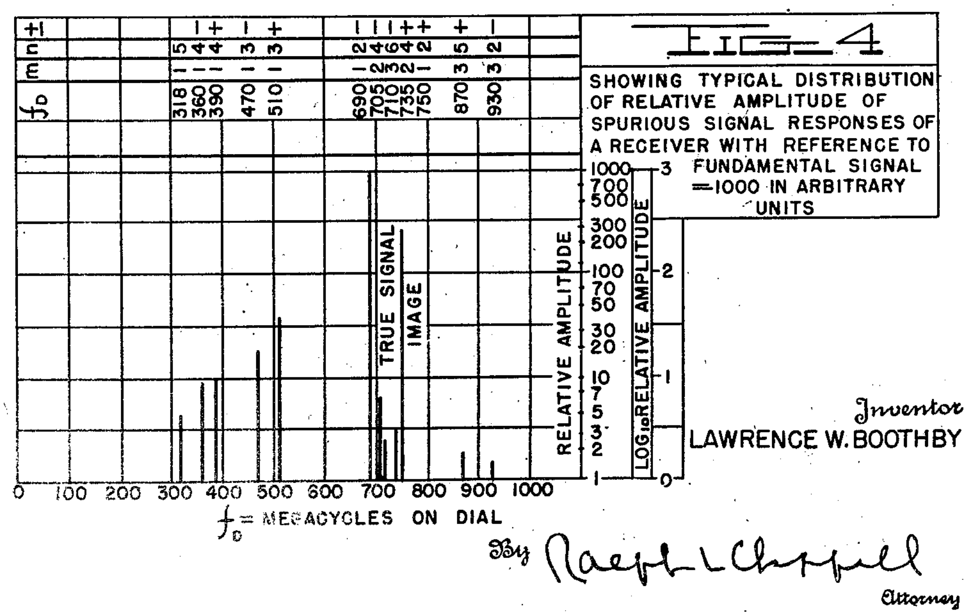
Fig. 4 is a diagram showing, in a typical case, various amplitudes of received spurious responses in relation to the amplitude of the received fundamental frequency.

Referring to Fig. 4, there is shown a typical distribution of the relative amplitude of spurious signal responses with reference to the fundamental signal amplitude arbitrarily taken as 1,000 units. The values of $m$, $n$, and the plus or minus signs of the intermediate frequencies in Equation 6 are identified alongside each corresponding response. The spurious responses obtained are apparently randomly distributed, so that it is difficult to predict which of the signals received corresponds to the fundamental signal frequencies, and on the basis of a comparison of the relative amplitudes obtained, a positive identification of the fundamental signal frequency is not possible. This is particularly true since the amplitude of the fundamental carrier frequencies is not generally known and may be varying with time. It is thus difficult to distinguish the fundamental signal frequency from a group of signals containing a large number of spurious responses, as well as possibly additional signals from other sources which may vary from extremely weak signals, to signals of considerable amplitude.

The present invention resolves the above mentioned difficulties, and provides a frequency distinguishing device whereby the fundamental frequency may be readily selected and identified from amongst a group of spurious frequencies, which may also contain other carrier fundamentals, as well as corresponding additional spurious frequencies belonging to the other fundamental signal frequencies.

Figure 5:
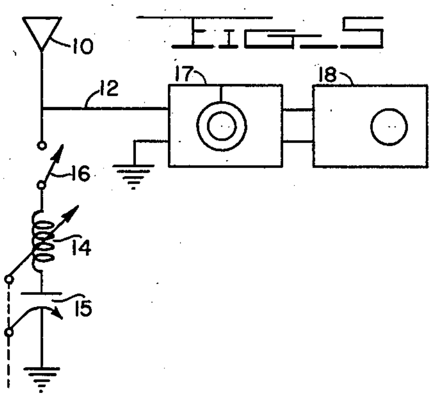
Fig. 5 is a schematic diagram of a system according to this invention.

Referring now to Fig. 5, there is shown an antenna 10, an input line 12, preferably of the coaxial type, an adjustable series resonant wave trap comprising variable inductance and capacitance elements 14 and 15, respectively, in series and grounded at one end, and capable of being connected or disconnected, as desired, across the input coaxial line by means of switch 16. The radio receiver 17, and the indicator 18, such as a cathode ray tube, are represented in block diagram in this figure.

Figure 6:
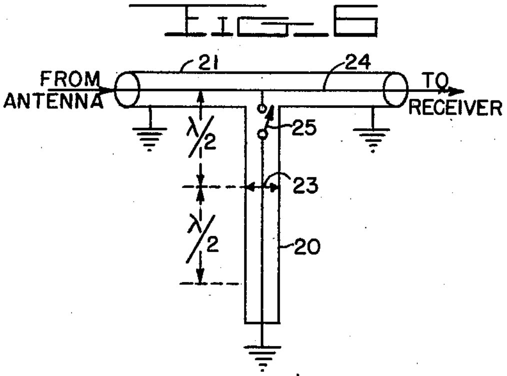
Fig. 6 is a schematic diagram of a stub connected across a coaxial line, according to this invention.

Referring to Fig. 6, there is shown a coaxial stub 20 connected across a coaxial feeder or input line 21 to produce a large attenuation to the signal supplied to the receiver when the shorting bar 23 is placed one-half wave length, or integral multiple thereof, from the central conductor 24 of the receiver input transmission line 21. The attenuation of the signal is due to the low impedance produced by the effect of a shorted half-wave stub placed across a transmission line. Successive nulls separated by intervals of one-half an electrical wave length may also be found along the stub 20, as indicated. The position of the nulls on the stub 20 is independent of the point at which the stub is tapped into the transmission line. However, the amount of attenuation obtained at the null point depends upon whether standing waves on the line present a voltage minimum, maximum, or intermediate value at the tapping point.

It is possible to calibrate a tuning stub over a wide frequency range in terms of the positions of the first null, but a greater accuracy in frequency measurement may be obtained by finding the distance between any two adjacent nulls.

A lumped circuit wave trap utilizing the inductance inherent in a variable condenser may be electrically equivalent to the stub and a more compact design may be thus obtained in a lower frequency range. However, this kind of device, unlike the stub, cannot be used without special caution, because spurious nulls may be observed when tuning signals higher in frequency than the calibrated range of the lumped circuit.

In any case, however, a switch 25 is provided for switching the stub 20 effectively in and out of circuit with the transmission line 21 from the antenna to the receiver. As above indicated, when the stub is disconnected from the transmission line 21, the insertion loss due to the wave trap in the antenna lead is negligible, and in this case the signal picked up by the receiver experiences negligible attenuation.

Figures 7, 8:
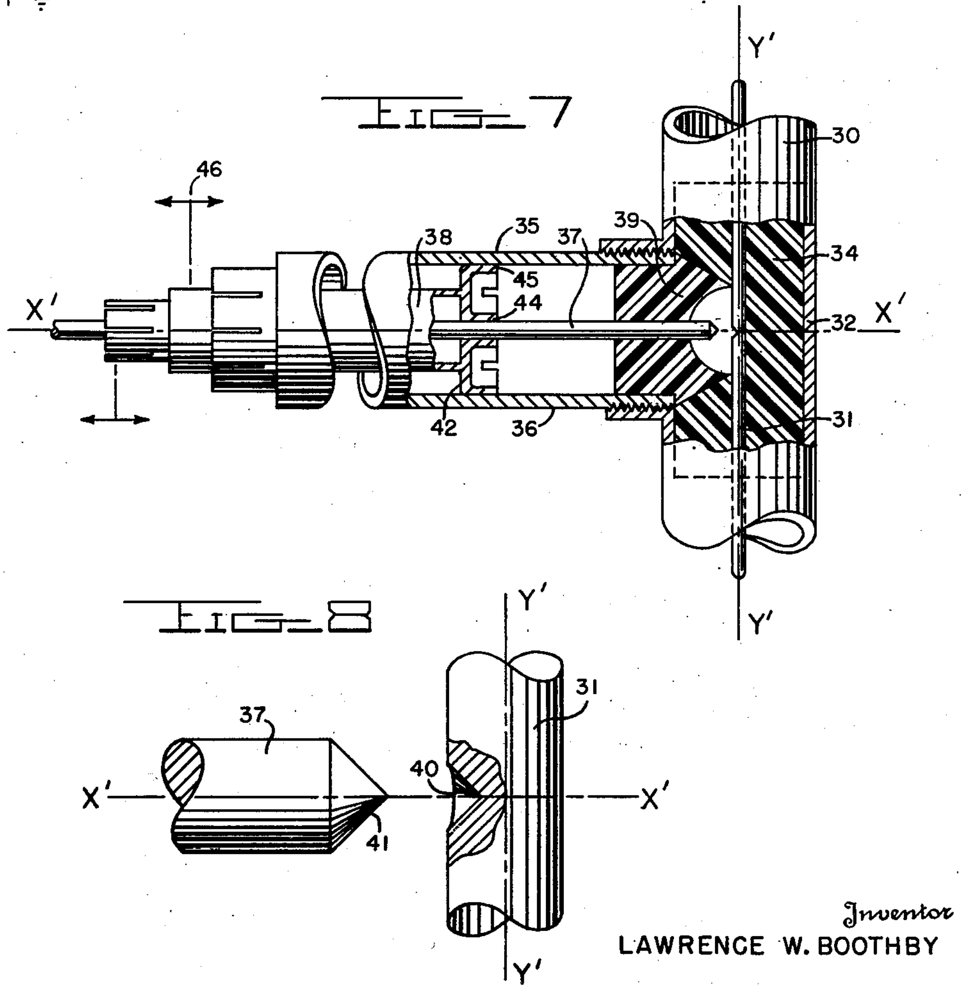
Fig. 7 is a detailed view of a preferred embodiment of this invention, taken at a T-section which is cut away in the plane of the stub and the coaxial cable to show the switching and frequency adjusting means.
Fig. 8 is an enlarged detail view of the contact elements of the device shown in Fig. 7 cut away to show the conical contact area in the coaxial line.

Referring now to Fig. 7, there is shown a coaxial line section 30 having an inner central conductor 31 and an outer conductor 32. A dielectric support 34 for the inner conductor 31 extends a short distance on both sides of the axis of the stub 35. The outer conductor 36 of the stub 35 is T-connected to the outer conductor 32 of the coaxial line 30. The inner central conductor 37 of the stub 36 is capable of reciprocatory or axial movement lengthwise of the stub. The inner conductor 37 is supported within the stub by the hollow cylinder 38 and, in addition, has its end portion supported by the dielectric insert 39. The dielectric insert 39 has interfitting engagement with the dielectric support 34 for the inner conductor 31 and both dielectric members may be comprised, for example, of polystyrene.

In Fig. 8 there is shown an enlarged view of the indented conical contact area 40 forming the electrical connection point or contact area of the inner conductor 31 of the coaxial line 30 for connection with the movable conductor 37 of the stub. The shape of the end of the inner conductor 37 of the stub 35 is conical, as indicated at 41, and is capable of making electrical contact with the similarly shaped indented conical surface 40 formed of the inner conductor 31 of the coaxial line 30 when the inner conductor 37 is moved to effect engagement of these surfaces. The surfaces of contact may be plated or formed from solid metals suitable for repeated contactor service, if desired. By appropriate axial motion of the inner conductor 37 relative to the outer conductor 36, the connection or disconnection of the stub 35 in and out of circuit with the coaxial line 30 is effected. While contact is being made, conductor element 37 of the stub is maintained in pressure contact with the inner conductor 31 at the contact areas 40 and 41, respectively. The electrical contact may be broken preferably by a sudden retractile action which causes the inner conductor 37 of the stub to be suddenly withdrawn from that of the line 30.

From the above description it will be seen that there is thus provided a novel switch for connecting or disconnecting a stub with respect to another coaxial line, the elements of this switch requiring a minimum of space and being of such construction as to enable the shorting contactor, generally designated 42, to be moved along the stub 35 to that minimum distance from the coaxial line 30 where the stub will be series-resonant at the highest frequency. By means of this invention, use of a comparatively bulky switch between stub and the coaxial line thus is avoided, and there results an increase in the maximum series-resonant frequency that is obtainable.

If a relatively bulky switch were employed between the stub and coaxial line, it would be difficult to determine whether the first, second or third nulls were being measured, and, in this case, it also would be necessary to make repeated checks along the length of the stub so as to determine the distance between adjacent nulls in order to be certain that the length being measured is actually a half wavelength.

In certain cases, however, where the frequency distinguishing device is to be utilized solely in a relatively low frequency range a larger coaxial snap switch may be employed as shown in my copending application Ser. No. 616,937, filed September 17, 1945.

With the present device a direct reading calibration on the dial is provided and it is unnecessary to check for adjacent nulls thereby increasing the facility and ease of operation.

The shorting contactor 42 comprises the fingered contact sleeves 44 and 45 which have sliding engagement with the central conductor 37 and the outer conductor 36 of the stub 35, and serve for short-circuiting these conductors.

The shorting contactor 42 is capable of axial motion, generally indicated by the arrows 46, independent of the axial motion of the inner conductor 37. The anti-resonant frequency of the stub 35 may thus be adjusted by means of the axial adjustment of the hollow cylinder 38 independently of the switch position. After adjusting the shorting contactor 42 for a definite anti-resonant frequency, the stub 35 may be disconnected or connected to the coaxial line 30 by the switching action of the movable conductor 37 without disturbing the frequency setting of the contactor 42.

To prevent radiation or pick-up by the adjustable stub 35, and switching means just-described, slitted sleeves 47 and 48 are provided (see Figs. 9 and 10) which respectively contact the inner and outer surfaces of the end of the shorting contactor 42 to the central conductor 37, and to the coaxial stub 35, respectively. The sleeves 47 and 48 each comprise an axially slotted cylinder of spring metal.

Figure 9:
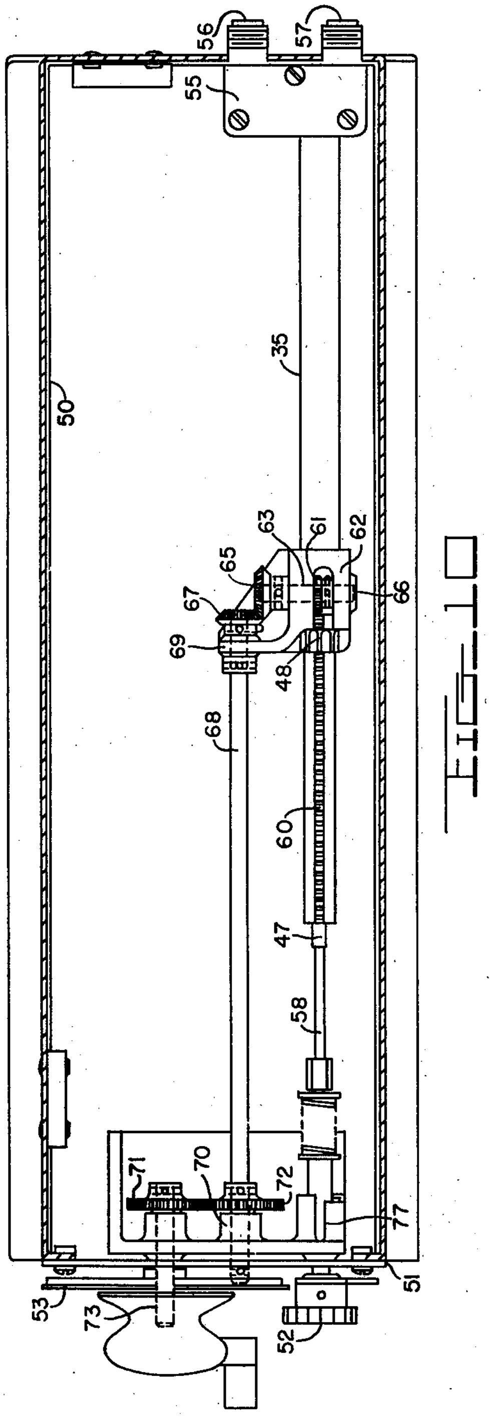
Fig. 9 shows an assembly in plan view of a preferred embodiment of this invention.
Figure 10:
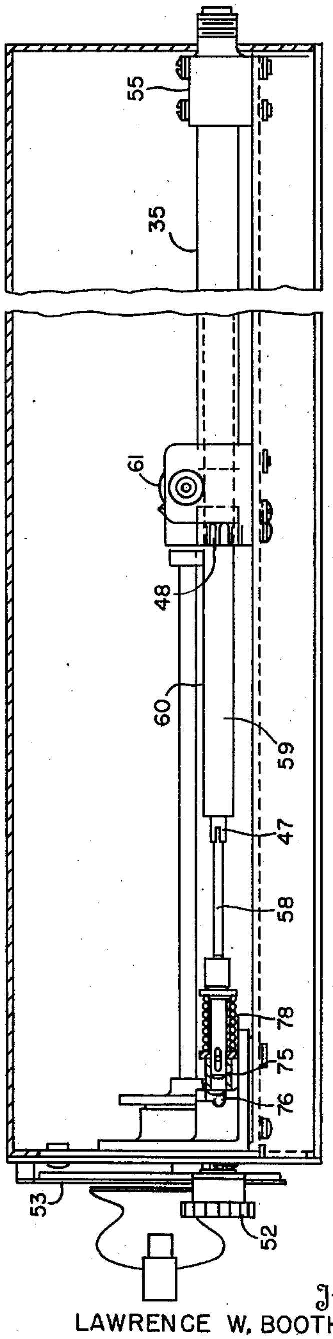
Fig. 10 shows a side view of the device shown in Fig. 9.

Referring further to Figs. 9 and 10, there is shown a supporting framework 50, a front panel 51 attached to the framework, a switch 52, and a calibrated dial 53 mounted on the panel. Mounted at the rear end of the framework 50 opposite the control panel 51 is a U-shaped coaxial line 55 having an input terminal 56 and an output terminal 57. Extending from the switch 52 is a relatively long thin rod 58 which slidably fits into the hollow cylindrical sleeve 59 which forms the shorting plunger. The hollow cylindrical sleeve 59 has the slit contactor sleeve 47 at its end so as to make a good electrical contact between the hollow cylindrical sleeve 59 and the central rod 58 and thus avoid radiation or pickup. The stub 35 is T-connected to the bottom of the U-shaped coaxial line 55 while the switch rod 58 passes down the center of the stub 35, thus forming the inner conductor 37 of the stub coaxial line, which is shorted to the outer conductor 36 of the stub coaxial line by means of the contactor fingers 44 and 45 on the hollow cylinder 38, as shown in Fig.

7. The end of the rod 58 is adapted to make contact with the central conductor 31 of the U-shaped coaxial line 55, of which the coaxial line portion 30 constitutes the transversely disposed bottom section of the U, at the point where the stub makes the T-connection with the coaxial line 55, as shown in Fig. 8.

Arranged along the hollow cylinder 59 is a rack 60 which engaged a pinion 61 mounted upon bearing members 62 and 63 attached to the outer surface of the stub line 35. The pinion 61 is actuated by a bevel gear 65 attached to the end of the shaft 66 which is rotably supported on the bearings 62 and 63. The bevel gear 65 has meshing engagement with a second bevel gear 67 which, in turn, is mounted on shaft 68. The shaft 68 is supported at one end portion in a bearing 69 which is preferably formed integral with bearings 62 and 63. Bevel gear 67 is actuated by shaft 68 which is arranged preferably directioned parallel to the rod 58 and further is supported at its other end in bearing member 70 mounted adjacent the panel. The dial 53 which controls the rotation of shaft 68 is mechanically geared to this shaft by means of the gears 71 and 72.

Revolving of the dial 53 in either direction, as by means of knob or crank 73, causes this rotary motion to be transmitted through the gears 71 and 72, shaft 68, and the bevel gears 67 and 65 to revolve the pinion 61 and actuate the rack 60. Thus, turning of the pinion 61 causes the hollow cylinder 59 to be either introduced further into the stub 35 or be retracted therefrom depending upon the direction of rotation of the pinion 61. In so doing the hollow cylinder 59 slides along the switch rod 58, but continues to make contact at its end between the inner wall of the stub 35 and the rod 58. By the controlled motion of the sliding contactor 42 attached to the end of the hollow cylinder 59, within the stub 35, the length of the stub may be controllably varied. Calibration may be provided to read the frequency of resonance of the stub corresponding to the particular position of the hollow cylinder contactor within the stub. The dial 53 on the front panel 51 is calibrated at the frequency of resonance of the stub corresponding to the position of the said dail.

In order to connect or disconnect the stub from electrical circuit relationship with the U-shaped coaxial line 55 the switch rod 58 is moved axially toward or away from the central conductor (not shown) of the U-shaped coaxial line 55. To accomplish this, the knob or crank assembly 52 is rotated and with it the inner sleeve 75 rotates until the pin 76 engages the slotted sleeve 77 which fits over the inner sleeve 75. By manually retracting the switch rod 58, it is caused to move away from the U-shaped coaxial line 55 thereby disconnecting the stub 35 from the inner conductor of coaxial line 55. In order to reestablish contact, the knob 52 is pushed inward and rotated so to disengage the pin 76 from the slotted sleeve 77 whereupon the spring 78 forces the rod 58 to make contact permanently with the inner conductor 37 of the coaxial line 35 until the knob is revolved back again to the position where the pin 76 can slip into the slot in the outer slotted sleeve 77.

By means of the novel switch rod device for connecting or disconnecting a stub from a coaxial line, as hereinabove illustrated, it now becomes possible to vary the length of the stub practically from zero up to any desired length, and thereby enable an extended frequency range to be obtained over which the stub will be series resonant.

While a stub itself provides a practically ideal series-resonant device for ultra high frequencies, the stub of the present invention further provides the additional feature of a means for introducing a series-resonant element across a coaxial line over an extended frequency range.

Figure 11:
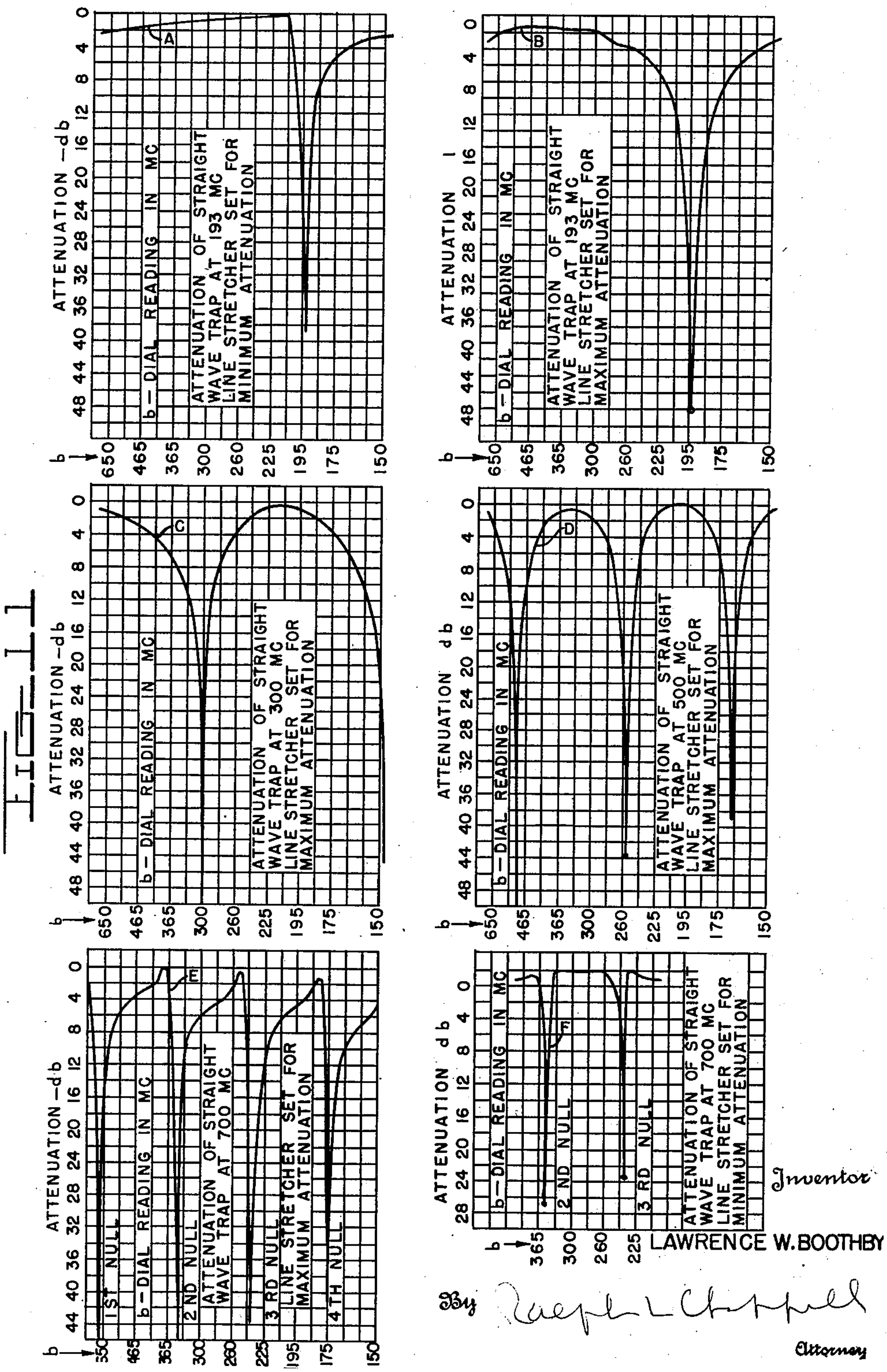
Fig. 11 shows various attenuation curves characteristic of the device shown in Figs. 9 and 10, indicating variations in attenuation obtained when the shorting contactor of the device is moved into various positions along the stub at various frequencies and with different lengths of line between the frequency distinguishing device and the superheterodyne receiver.

Referring to Fig. 11, there is shown a number of curves relating to the attenuation of the signal received by the superheterodyne receiver when the shorting contactor of a typical stub is placed at various positions along the stub. In preparing the curves various lengths of line were simulated by a line stretcher to obtain the maximum and minimum attenuation which were to be expected using various lengths of line.

Comparison of curve A to F, inclusive in Fig. 11, shows that the length of the line between the wave traps and the radio receiver exercises considerable influence on the symmetry, or lack of symmetry, of the attenuation curve; and, also upon the maximum and minimum attenuation; but, however, the position of the maximum attenuation point, or null point is not affected thereby.

Figure 12:
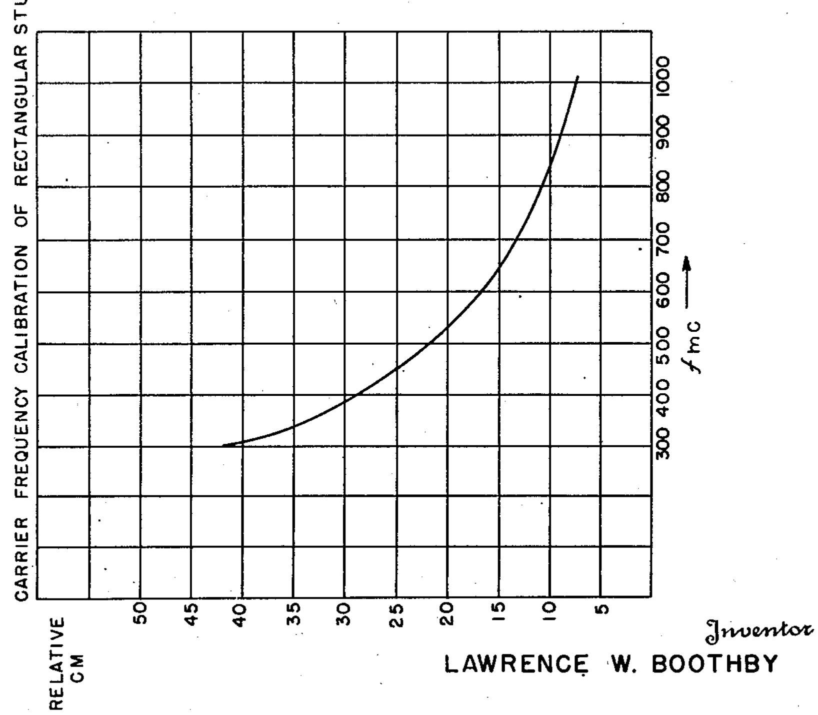
Fig. 12 shows a typical carrier frequency calibration of a device such as is shown in the Figs. 9 and 10.

Referring to Fig. 12 there is shown a typical carrier frequency calibration of a stub, comprising a graph of the dial reading versus the frequency of series resonance of the stub. While the shape of curve as shown may be typical, it is to be understood that other shapes of calibration curves may be obtained, including a straight line linear or logarithmic or other calibration, through the use of suitable mechanical transmission systems between the dial and the shorting contactor on the stub.

Figure 13:
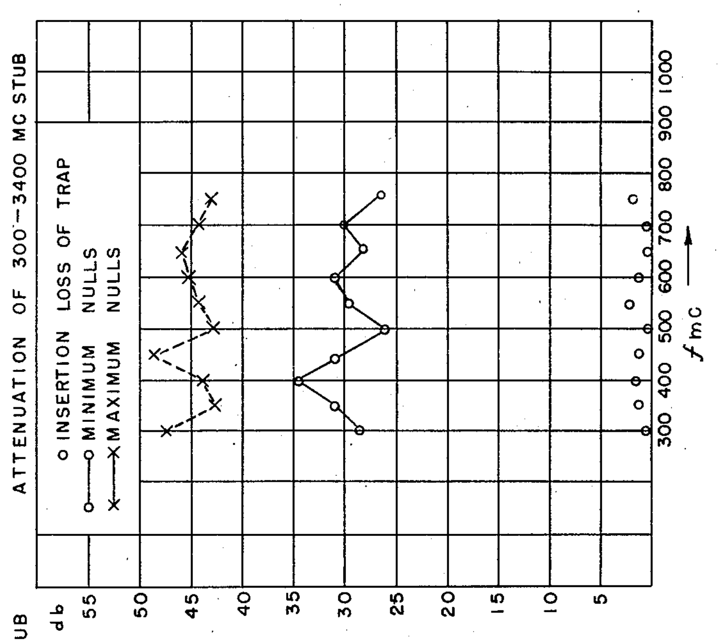
Fig. 13 is a plot of the maximum and minimum attenuation obtainable at various frequencies with a typical device according to this invention.

In Fig. 13 there is summarized the maximum and minimum attenuation observed throughout the frequency range from 300 to 750 megacycles with a particular embodiment of this invention, herein described. Although there is considerable variation between maximum and minimum attenuation obtainable throughout this frequency range nevertheless, the minimum attenuation is adequate to produce satisfactory results throughout the entire frequency range.

On strong signals, an accurate frequency setting may be obtained by merely adjusting the shorting contactor on the stub to the position of maximum attenuation. However, on weak signals the maximum attenuation which will permit the signal to be just perceptible, is considerably less than the very greatest attenuation obtained at the point. Consequently weak signals will disappear a considerable distance to each side of the actual null point, and since the symmetry of the curve will vary according to the frequency of the signal, and according to the length of the line attached between the wave trap and the receiver; therefore, in general, no prediction can be made as to the inaccuracy thereby introduced into the frequency measurement.

However, for purposes of distinguishing the frequency of weak signals it is usually satisfactory to merely observe the mid-point between the positions where the weak signal is just perceptible. This mid-point will represent to a sufficient degree of accuracy a frequency reading which may be compared with the reading on the receiver dial in order to check for the fundamental frequency.

While the novel switching arrangement described above and shown in Figs. 7 to 10 inclusive is used in connection with a frequency measuring device, it will be understood that the mechanical construction described above is equally useful with other apparatus such as, for example, in television equipment, radio-locating devices, and many other ultra high frequency applications requiring the use of coaxial switches.

It will be understood, however, that the herein described frequency distinguishing device is not limited in its usefulness to superheterodyne receivers but may be employed for example in connection with untuned receivers as well.

As various other changes may be made in the form, construction and arrangement of the parts herein without departing from the spirit or scope of the invention, and without sacrificing any of its advantages, it is to be understood that all matter herein is to be interpreted as illustrative and not in the limiting sense.

The invention described herein may be manufactured and used by or for the Government of the United States of America for governmental purposes without the payment of any royalties thereon or therefor.

What is claimed is:

1. In combination, a coaxial line including input and output terminals and a central conductor, a coaxial stub disposed at an angle to said coaxial line and provided with an axially reciprocable central conductor, the central conductor of said line having an indented portion for receiving one end of said axially reciprocable central conductor of said stub, means including a mechanism selectively reciprocating said central conductor axially of said stub into a position of mechanical and electrical contact with said indented portion and out of said position to a point external to the outer conductor of said line to couple said stub into and out of energy transferring relationship with said line, a contactor disposed concentrically between the stub central and outer conductors for short circuiting the stub, and a mechanism adjustably positioning said contactor axially of said stub.

2. A frequency distinguishing device comprising a coaxial line having input and output terminals and a central conductor, a coaxial stub disposed at an angle to said coaxial line and including an axially reciprocable central conductor, the central conductor of said line having an indented portion for receiving one end of said axially reciprocable central conductor of said stub, means including a mechanism selectively reciprocating said central conductor of said stub into a position of mechanical and electrical contact with said indented portion and out of said position to a point external to the outer conductor of said line to couple said stub into and out of energy transferring relationship with said line, a contactor disposed concentrically between the stub central and outer conductors for short circuiting the stub, and means for selectively positioning said contactor axially in said stub to control the attenuation of a signal of selected frequency in said line.

3. A frequency distinguishing device comprising a coaxial line including an outer conductor and a central conductor, an outer conducting cylinder, said outer conductor of said line provided with an opening, means securing one end of said cylinder to the outer conductor of said line coincident with the periphery of said opening, a reciprocable central conducting rod concentrically mounted in said cylinder, a cylindrical sleeve disposed concentrically between said conducting cylinder and said rod, a shorting contactor mounted on the end of said sleeve nearest said one end of said cylinder for short circuiting said cylinder and said central conducting rod, said sleeve extending axially beyond the other end of said outer conducting cylinder, first flexible contactor means secured to said other end of said cylinder for electrically short circuiting said cylinder and said sleeve, said central conducting rod extending axially beyond the other end of said sleeve, second flexible contactor means secured to said other end of said sleeve for electrically short circuiting said sleeve and said rod, and means reciprocating said central conducting rod through said opening into and out of contact with a portion of the central conductor of said line.

LAWRENCE W. BOOTHBY.

REFERENCES CITED

The following references are of record in the file of this patent:

UNITED STATES PATENTS

| Number | Name | Date |
|---|---|---|
| 2,106,713 | Bowen | Feb. 1, 1938 |
| 2,189,549 | Hershberger | Feb. 6, 1940 |
| 2,245,138 | Zottu | June 10, 1941 |
| 2,373,233 | Dow et al. | Apr. 10, 1945 |
| 2,408,420 | Ginzton | Oct. 1, 1946 |
| 2,499,777 | Pound | Mar. 7, 1950 |
| 2,526,678 | Mallett et al. | Oct. 24, 1950 |